United States Patent
Hong

(10) Patent No.: US 8,139,265 B2
(45) Date of Patent: Mar. 20, 2012

(54) COLOR SPACE CONVERSION APPARATUS AND METHOD FOR CONTROLLING THE SAME

(75) Inventor: Jin Kyung Hong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 913 days.

(21) Appl. No.: 12/143,111

(22) Filed: Jun. 20, 2008

(65) Prior Publication Data
US 2009/0059326 A1 Mar. 5, 2009

(30) Foreign Application Priority Data
Aug. 28, 2007 (KR) .................. 10-2007-0086713

(51) Int. Cl.
*H04N 1/04* (2006.01)

(52) U.S. Cl. .......... 358/1.9; 358/518; 358/523; 358/525

(58) Field of Classification Search ............... 358/1.9, 358/518, 523, 525, 501
See application file for complete search history.

(56) References Cited

U.S. PATENT DOCUMENTS
6,778,185 B1 * 8/2004 Moroney .................. 345/590
* cited by examiner

*Primary Examiner* — Houshang Safaipour
(74) *Attorney, Agent, or Firm* — Staas & Halsey LLP

(57) ABSTRACT

A color space conversion apparatus and a method of controlling the same, the color space conversion apparatus including: a first color space conversion unit to convert a first color space into a first Lab color space; a second color space conversion unit to convert a second color space into a second Lab color space; a spherical color space conversion unit to expand the first and second Lab color spaces into a spherical color space; and a spherical gamut mapping unit to perform gamut mapping between the first and second color spaces through spherical parametrization, thus avoiding problems in color reproduction caused by the lack of one-to-one correspondence between Lab color space values of the input and output devices.

20 Claims, 7 Drawing Sheets

SP1 : A', B', C', D'
SP2 : a', b'

COLOR SPACE CONVERSION APPARATUS AND METHOD FOR CONTROLLING THE SAME

CROSS-REFERENCE TO RELATED APPLICATION

This application claims the benefit of Korean Patent Application No. 2007-86713, filed Aug. 28, 2007, in the Korean Intellectual Property Office, the disclosure of which is incorporated herein by reference.

BACKGROUND OF THE INVENTION

1. Field of the Invention

Aspects of the present invention relate to a color space conversion apparatus and a method of controlling the same, and more particularly, to a color space conversion apparatus performing gamut mapping in which an input color signal is properly converted such that color gamuts between a standard color signal of an input device and an output device reproducing the standard color signal are matched up to each other so as to improve color reproduction, in the case that the color gamuts differ from each other, and a method of controlling the same.

2. Description of the Related Art

In general, color reproducing devices (such as a monitor, a scanner, a printer, etc.) use different color spaces or color models according to respective fields of use. For example, a color image printing devices uses a cyan, magenta, and yellow (CMY) color space, and a color cathode ray tube (CRT) monitor or a computer graphic device uses a red, green, and blue (RGB) color space. Furthermore, in order to define colors to be correctly reproduced by any device, device independent colors, such as Commission Internationale de l'Eclairage (CIE) color spaces, are used. The CIE color spaces typically include a CIE L*a*b (Lab) color space, a CIE-XYZ (XYZ) color space, and a CIE L*u*v (hereinafter, referred to as 'Luv') color space.

In addition to the above color spaces, the color reproducing devices may use different color gamuts. While the color space is a method of defining a color (i.e., a method of indicating the relation of a color with other colors), the color gamut is a color reproducing range. Thus, in the case that a color gamut of an input color signal and a color gamut of a device to reproduce the input color signal differ from each other, gamut mapping is applied. Gamut mapping is a method in which the input color signal is properly converted such that the color gamuts match each other and color reproduction is improved. For example, when the color gamut of an input device is wider than the color gamut of an output device, the output device transforms a color that cannot be reproduced by the printer into a color that can be reproduced by the printer, and then outputs the color.

Gamut mapping between different color devices is generally performed by a method in which a color space of an input color signal is converted, and then lightness (L) and chroma are mapped so that hue is not converted. Specifically, the input color signal is converted from a device dependent color space (such as an RGB color space and a CMYK color space) to a device independent color space (such as a Lab color space, a XYZ color space, and a Luv color space), the device independent color space is converted into a LCH coordinate system indicating hue, lightness, and chroma, and then gamut mapping with respect to lightness and chroma is performed on a plane in which hue is regular.

In gamut mapping, a method in which chroma is mapped while maintaining lightness, and a method in which lightness and chroma are concurrently converted (i.e., a vector mapping method) are generally used. Moreover, other methods modified from the above methods may also be used.

However, the conventional methods cannot effectively express reproducible ranges of all colors. For example, in a color image treating method disclosed in U.S. Pat. No. 4,758,885, all input color signals are uniformly compressed, thus causing excessive color transformation beyond necessity.

SUMMARY OF THE INVENTION

Aspects of the present invention provide a color space conversion apparatus that achieves high-quality color reproduction even though color reproducing characteristics between an input device and an output device differ from each other, and a method of controlling the same.

According to an aspect of the present invention, there is provided a color space conversion apparatus including: a first color space conversion unit to convert a standard red, green, and blue (RGB) color space into a first Lab color space; a second color space conversion unit to convert a cyan, magenta, yellow, and key (CMYK) color space into a second Lab color space; a spherical color space conversion unit to expand the converted first and second Lab color spaces to a same spherical surface so as to convert the first and second Lab color spaces into a spherical color space; and a spherical gamut mapping unit to map color gamuts of the first and second Lab color spaces, expanded to the same spherical surface, in the converted spherical color space.

According to another aspect of the present invention, there is provided a color space conversion method including: converting a standard RGB color space into a first Lab color space; converting a CMYK color space into a second Lab color space; expanding the first and second Lab color spaces to a same spherical surface so as to convert the first and second Lab color spaces into a spherical color space; and mapping color gamuts of the first and second Lab color spaces, expanded to the same spherical surface, in the converted spherical color space.

According to yet another aspect of the present invention, there is provided a color space conversion apparatus to perform gamut mapping between a first Lab color space converted from a first color space and a second Lab color space converted from a second color space, the color space conversion apparatus including: a spherical gamut mapping unit to map a color gamut of the first Lab color space and a color gamut of the second Lab color space, expanded to a same spherical surface, in a converted spherical color space.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
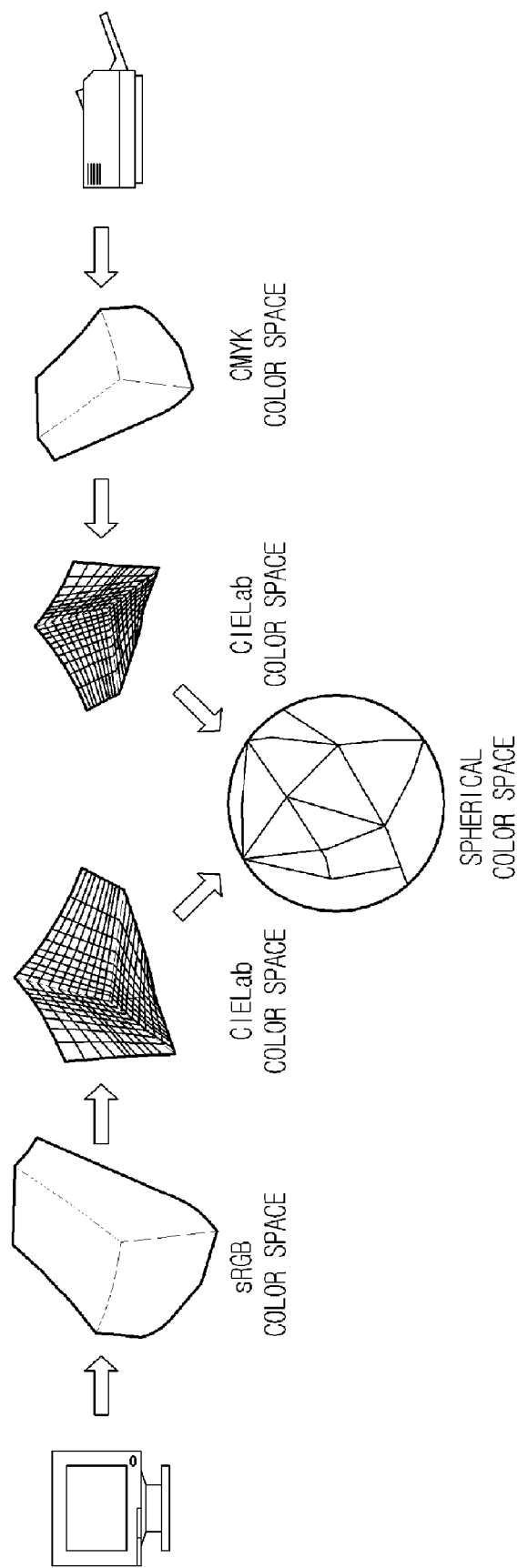
FIG. 1 is a view illustrating color space conversion of a color space conversion apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A difference between a color space expressed by an input device and a color space expressed by an output device results in a color difference between an original image (i.e., an image visible to the ordinary sight) and an output image. Therefore, for example, because a cyan, magenta, yellow, and key (CMYK) color space of the output device is narrower than a standard red green, and blue (RGB) (sRGB) color space of the input device, a color reproducing method having a one-to-one correspondence is applied.

FIG. 1 is a view illustrating color space conversion of a color space conversion apparatus according to an embodiment of the present invention. Referring to FIG. 1, after an sRGB color space of an input device is converted into a CIELab (Lab) color space, the range of the Lab color space is spherically extended. Thus, the Lab color space is converted into a spherical color space. In the same manner, after a CMYK color space of an output device is converted into a Lab color space, the range of the Lab color space is spherically extended. Thus, the Lab color space is also converted into a spherical color space. The color space conversion apparatus uses, in the spherical color space, the range of the Lab color space spherically extended from the Lab color space converted from the sRGB color space as a source, and the range of the Lab color space spherically extended from the Lab color space converted from the CMYK color space as a destination, in order to map the color gamut of the input device is to locations of points where a color difference and a lightness difference are minimal.

Figure 2:
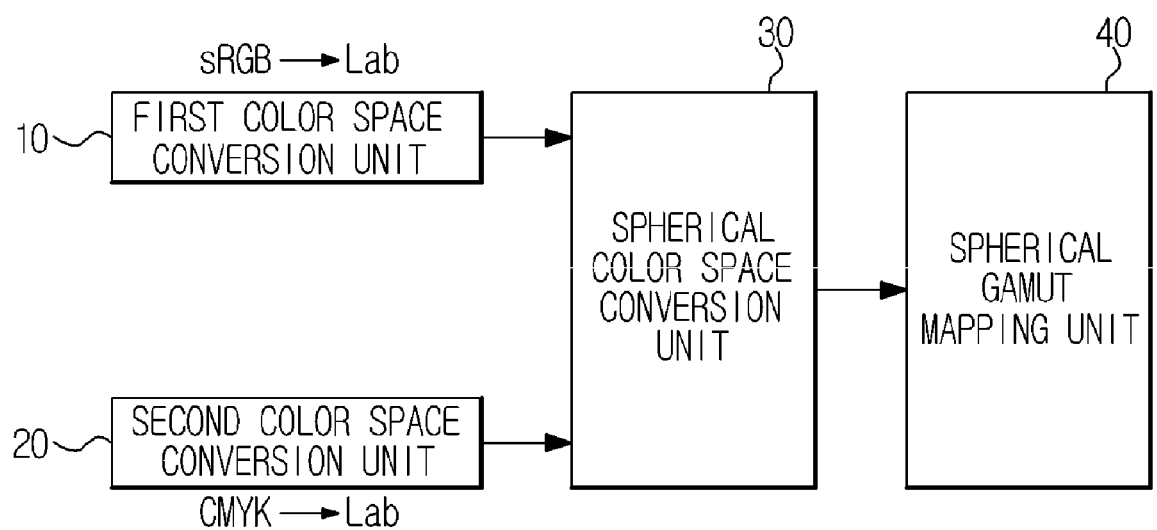
FIG. 2 is a block diagram of the color space conversion apparatus according to an embodiment of the present invention.

FIG. 2 is a block diagram of the color space conversion apparatus according to an embodiment of the present invention. Referring to FIG. 2, the color space conversion apparatus includes a first color space conversion unit 10, a second color space conversion unit 20, a spherical color space conversion unit 30, and a spherical gamut mapping unit 40.

The first color space conversion unit 10 converts the sRGB color space of the input device into the Lab color space. In the Lab color space, L, a, and b represent three basic coordinates. That is, L represents luminosity, and a and b are termed opponent color axes. More particularly, a represents a position between red and green and b represents a position between yellow and blue. A color difference in this Lab color space is a three-dimensional distance between locations of two colors. When the three-dimensional distance between two colors is long (e.g., longer than a predetermined distance), the color difference between the two colors is determined to be great, and when the three-dimensional distance between the two colors is short (e.g., shorter than a predetermined distance), the two colors are determined to be the same.

The second color space conversion unit 20 converts the CMYK color space of the output device into the Lab color space.

The spherical color space conversion unit 30 expands the first Lab color space, converted from the sRGB color space by the first color space conversion unit 10, and the second Lab color space, converted from the CMYK color space by the second color space conversion unit 20, to the same spherical surface. That is, the spherical color space conversion unit 30 converts the first and second Lab color spaces into the spherical color space. Here, the spherical color space conversion unit 30 expands the first Lab color space to a spherical surface having a designated radius and, thus, forms a first coordinate system (SP1) (i.e., a set of three-dimensional points), and expands the second Lab color space to the same spherical surface and, thus, forms a second coordinate system (SP2) (i.e., a set of three-dimensional points).

The spherical gamut mapping unit 40 determines the points of the SP1 that have minimal color differences and lightness differences with the SP2 in the spherical color space converted from the first and second Lab color spaces by the spherical color conversion unit 30, determines locations of the remaining points of the SP1 by interpolation, and performs gamut mapping by a method in which the determined points of the first coordinate system are mapped to the second coordinate system.

FIGS. 3 to 6 are views for two-dimensionally illustrating a three-dimensional spherical parametrization method of the color space conversion apparatus according to an embodiment of the present invention. Referring to FIGS. 2 to 6, an RGB color space of an input device is converted into a Lab color space, and the range of the Lab color space is extended to a spherical SP1. In the same manner, a CMYK color space of an output device is converted into a Lab color space, and the range of the Lab color space is extended to a spherical SP2.

By using the SP1 as a source and using the SP2 as a destination, the points of the SP1 that have minimal color differences and lightness differences with the points of the SP2 are mapped to the locations of the points of the SP2. Since the number of points of the SP1 is greater than the number of points of the SP2 having the same radius (R) as that of the SP1, the points of the SP1 that have minimal mean square error (MSE) values from the points of the SP2 are selected, and the locations of the selected points are determined. Accordingly, in-gamut colors can be reproduced without transformation.

When the locations of the points of the SP1 that correspond to the points of the SP2 are selected, the locations of the remaining points of the SP1 are determined by selection of the neighboring points having the minimal MSE values from the SP2 and interpolation using values of the neighboring points. The MSE values may be calculated according to:

$$MSE = \sqrt{(SP1(L) - SP2(L))^2 + (SP1(a) - SP2(a))^2 + (SP1(b) - SP2(b))^2}$$

Here, the number of the neighboring points may be selected and interpolated, or points respectively having MSE values less than the critical value may be selected as the neighboring points and interpolated. From the viewpoint of characteristics of spherical parametrization, spherical parametrization reflects the density of the input points, and thus allows colors to be minutely reproduced with reference to peripheral values. Accordingly, out-of-gamut colors can be reproduced through interpolation. Here, contouring caused by the convergence of the out-of-gamut onto one point does not occur.

Figure 3:
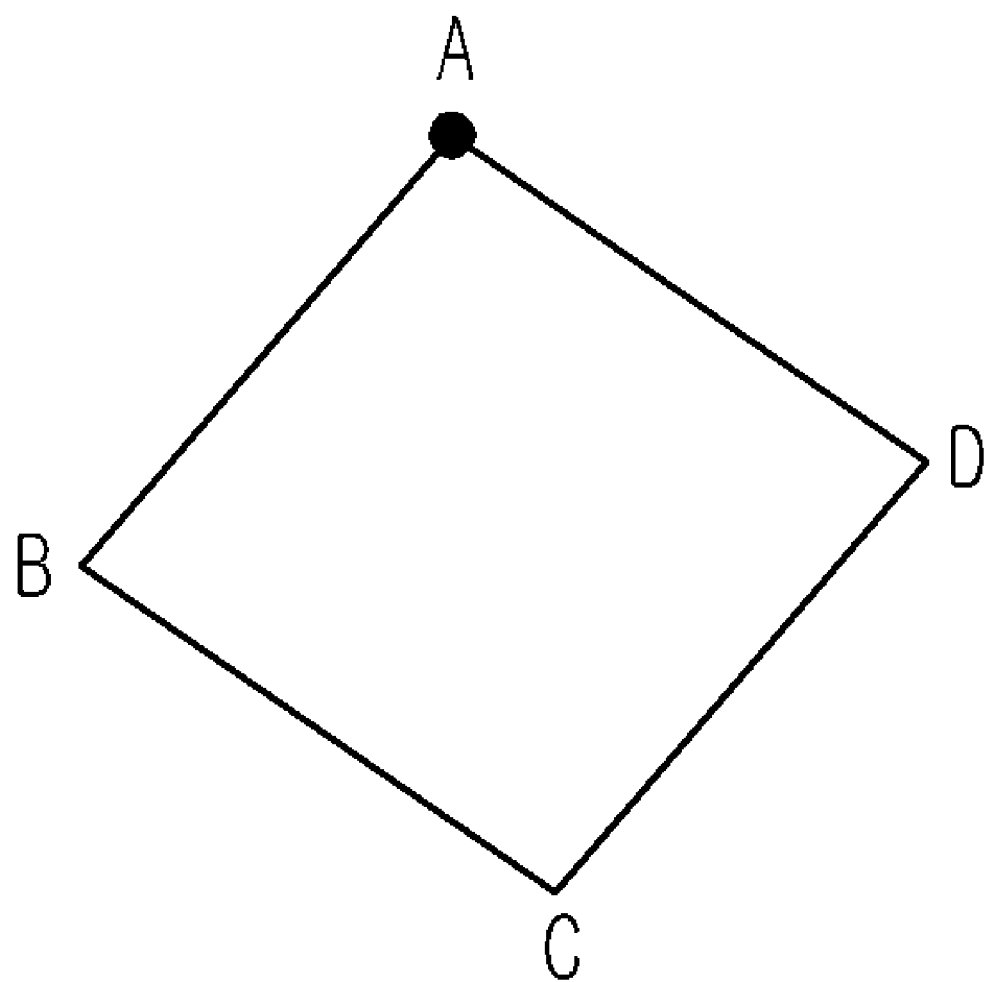
FIGS. 3 to 6 are views for two-dimensionally illustrating a three-dimensional spherical parametrization method of the color space conversion apparatus according to an embodiment of the present invention.
Figure 4:
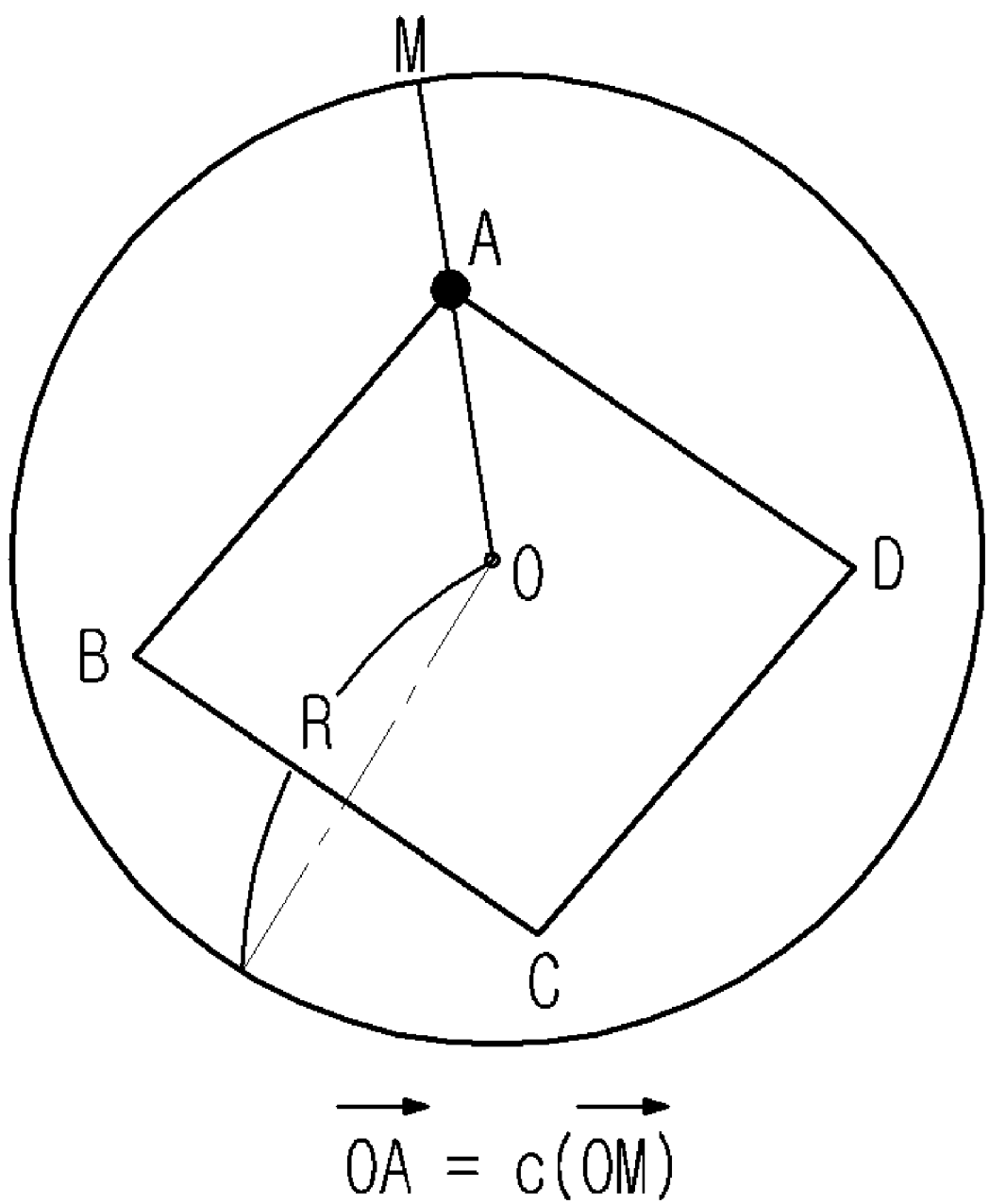
Figure 5:
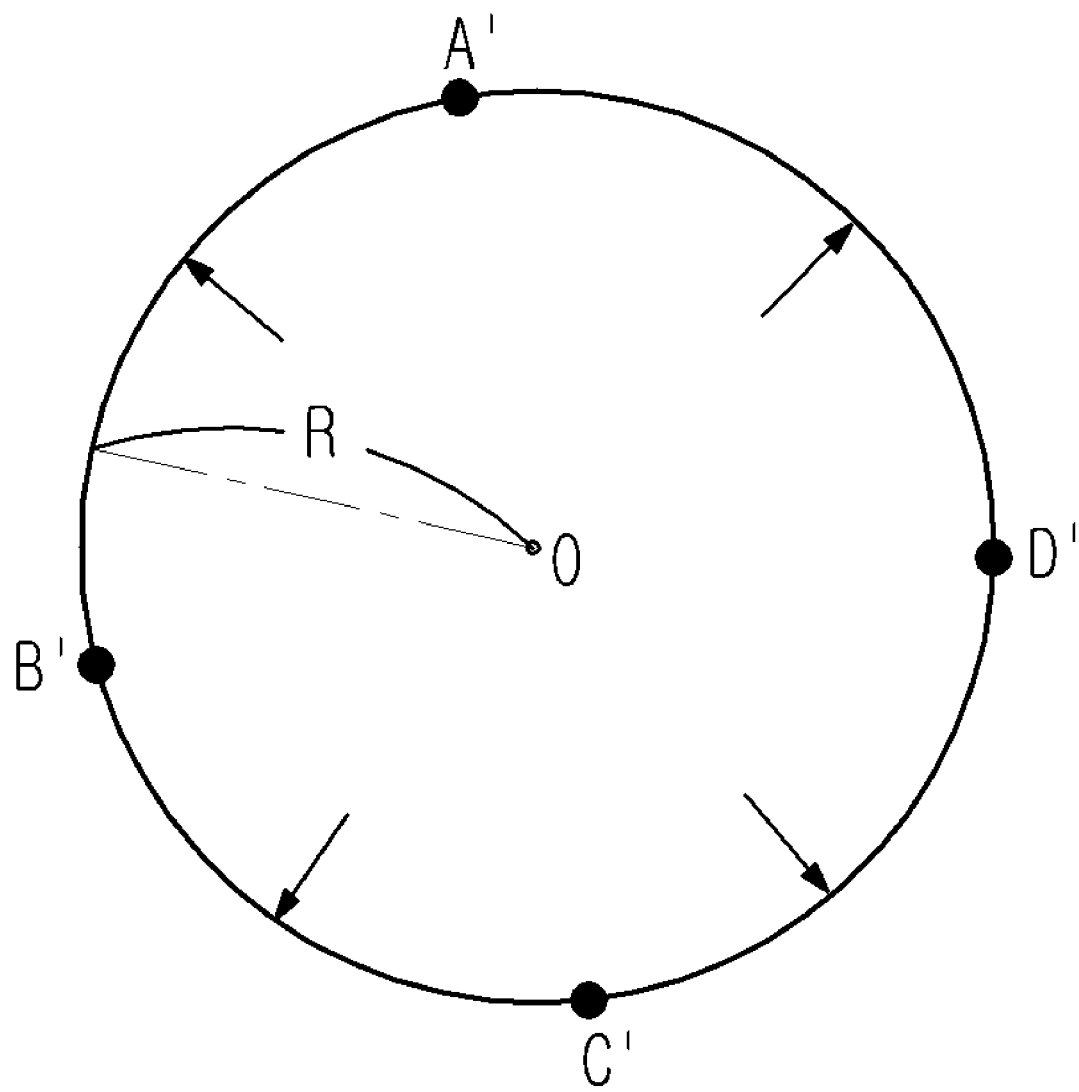

When those points on the Lab color spaces are referred to as A, B, C, and D (as illustrated in FIG. 3), and a point on the spherical surface corresponding to A is referred to as M, the points A and M are located on one straight line from the origin O (as illustrated in FIG. 4). A constant c represents a distant ratio between a vector OA and a vector OM. The points A, B, C, and D, which have similar distances from the origin O, are placed on the spherical surface at the equivalent locations. Furthermore, in order to determine a location of the point A', which is spherically expanded from the point A (as illustrated in FIG. 5), a Laplacian matrix is used as a weight so as to reflect the locations of the peripheral points B, C, and D. Equations satisfying the above requirements may be defined as follows:

$$x_i^2 + y_i^2 + z_i^2 = r_i^2$$

$$c_i L_i - Lw[i] \cdot x = 0$$

$$c_i A_i - Lw[i] \cdot y = 0$$

$$c_i B_i - Lw[i] \cdot z = 0$$

The above equations are solved with respect to the Lab color space converted from the sRGB color space and the Lab color space converted from the CMYK color space, thus generating the SP1 (xi, yi, zi) and the SP2 (xn, yn, zn).

Figure 6:
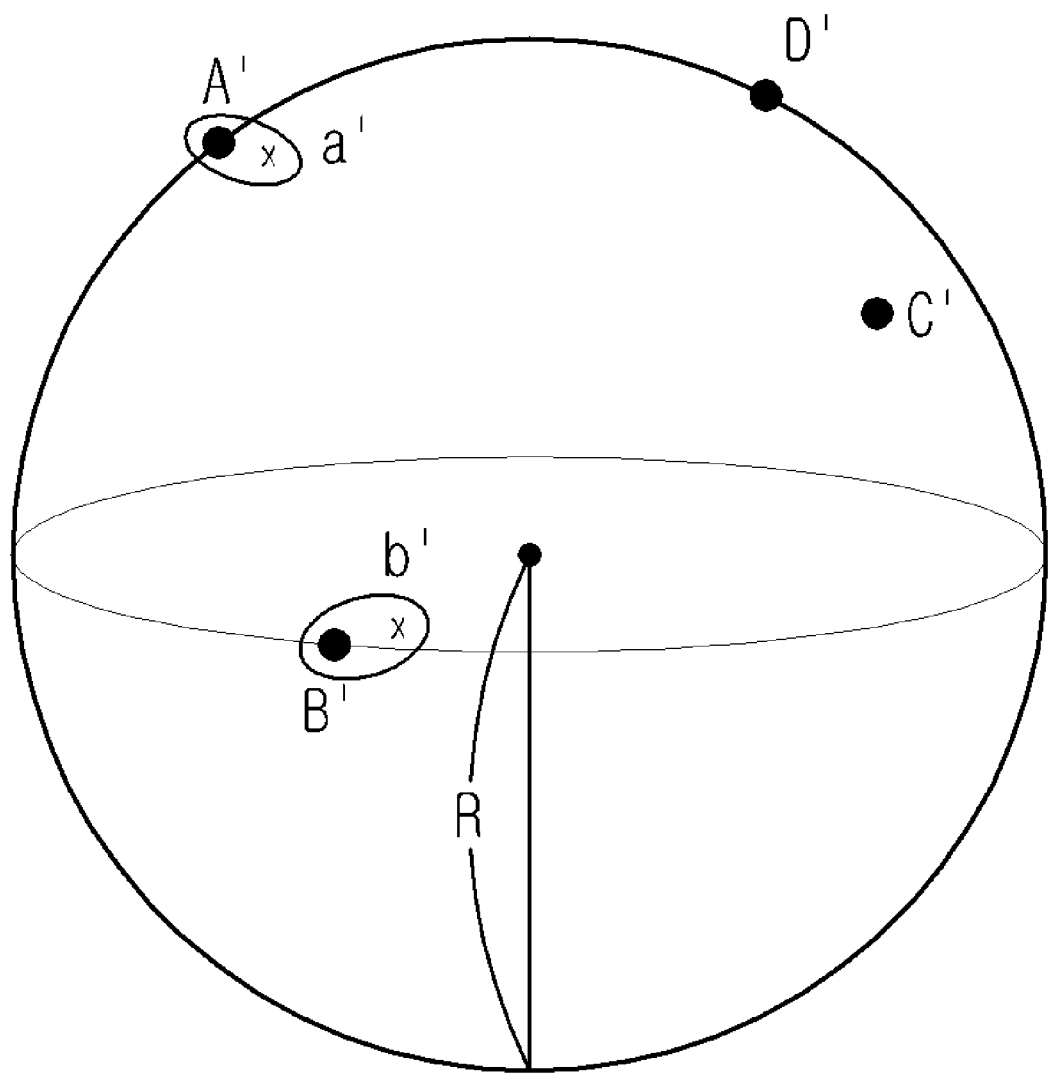

After the SP1 and the SP2 are generated, when the Lab color space of the SP1 is a source and the Lab color space of the SP2 is a destination, the locations of the points of the SP1 having the same number as that of the points of the SP2 are determined to be the corresponding points of the SP2 that have the minimal MSE values from the points of the SP1. That is, gamut mapping is performed in a manner in which the Lab source of the SP1 corresponding to this set of points (i.e., having corresponding locations in the SP2) is located on the Lab destination of the SP2. In a case where the points of the SP1 are A', B', C', and D', and the points of the SP2 are a' and b' (as illustrated in FIG. 6), the points A' and B' respectively correspond to the points a' and b', which have the minimal distance differences (the minimal lightness differences and color differences) with the points A' and B', respectively. Thus, gamut mapping is performed by the correspondence between the points A' and B' and the points a' and b'.

Furthermore, the locations of the remaining points of the SP1 exceeding the number of the points of the SP2 are determined to be points of virtual locations obtained by interpolation using values of the neighboring points of the SP2 having the minimal MSE values. That is, gamut mapping is performed in a manner in which the Lab source of the SP1 corresponding to this set of points (i.e., having locations outside of the SP2) is located on the Lab destination of the SP2 through interpolation. For example, the remaining points of the SP1 (i.e., C' and D') do not correspond directly to the SP2 (as illustrated in FIG. 6), and thus gamut mapping is performed by the determination of the corresponding locations of the remaining points C' and D' through interpolation, such as by calculating a mean value of a distance with the points a' and b' of the SP2.

Figure 7:
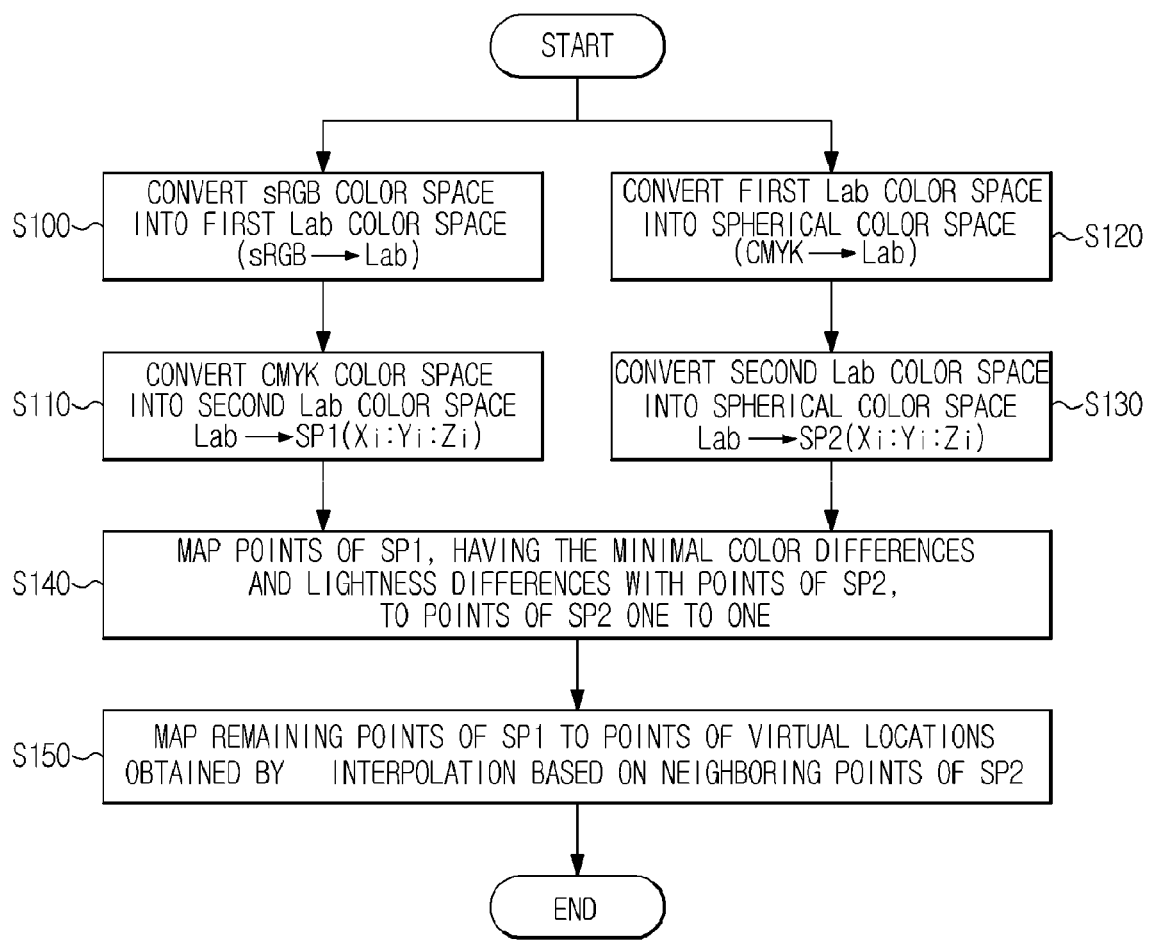
FIG. 7 is a flow chart illustrating a color space conversion method according to an embodiment of the present invention.

FIG. 7 is a control flow chart illustrating a color space conversion method according to an embodiment of the present invention. Referring to FIG. 7, the first color space conversion unit 10 converts an sRGB color space value of an input device into a Lab color space value in operation S100. Then, the spherical color space conversion unit 30 converts the Lab color space into a spherical color space so as to generate a first coordinate system (SP1) (i.e., a set of points) spherically expanded from the Lab color space in operation S110.

The second color space conversion unit 20 converts a CMYK color space of an output device into a Lab color space value in operation S120. Then, the spherical color space conversion unit 30 converts the Lab color space into the spherical color space so as to generate a second coordinate system (SP2) (i.e., a set of points) spherically expanded from the Lab color space in operation S130. It is understood that operations S120 and S130 may occur simultaneous to, before, or after operations S100 and S110.

Thereafter, the spherical gamut mapping unit 40 determines that the points of the SP1 having the same number as that of the points of the SP2 correspond to the points of the SP2 that have the minimal MSE values from the points of the SP1 in operation S140. That is, gamut mapping is performed in a manner in which the Lab source of the SP1 corresponding to this set of points is located on the Lab destination of the SP2. Furthermore, the spherical gamut mapping unit 40 determines that the remaining points of the Lab source of the SP1 exceeding the number of the points of the SP2 correspond to points of virtual locations obtained by interpolation of values of the neighboring points of the SP2 having the minimal MSE values in operation S150. That is, gamut mapping is performed in a manner in which the Lab source of the SP1 corresponding to this set of points is located on the Lab destination of the SP2 through interpolation. Thereby, a three-dimensional color gamut boundary description is completed.

As is apparent from the above description, a color space conversion apparatus and a method of controlling the same according to aspects of the present invention achieve high-quality color reproduction even though an input device and an output device have different color reproduction characteristics. Furthermore, according to aspects of the present invention, the color space conversion apparatus and the method of controlling the same are advantageous in that a color difference and a lightness difference can be concurrently considered on a three-dimensional space.

Also, according to aspects of the present invention, the color space conversion apparatus and the method of controlling the same remove problems, such as a contouring effect, caused by a method in which the in-gamut and the out-of-gamut are independently considered, or pure color reproduction.

Moreover, according to aspects of the present invention, the color space conversion apparatus and the method of controlling the same simply and rapidly solve calculation problems generated by gamut mapping for color reproduction, such as an increase in a parametrization range by applying a weight according to preferred color ranges using characteristics of spherical parametrization or interpolation from color values of neighboring points through connection data.

Aspects of the present invention can also be embodied as computer-readable codes on a non-transitory computer-readable recording medium. Also, codes and code segments to accomplish the present invention can be easily construed by programmers skilled in the art to which the present invention pertains. The non-transitory computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices.

Although a few embodiments of the present invention have been shown and described, it would be appreciated by those skilled in the art that changes may be made in this embodi-

What is claimed is:

1. A color space conversion apparatus to perform gamut mapping between a first color space and a second color space, the color space conversion apparatus comprising:
   a first color space conversion unit to convert the first color space into a first Lab color space;
   a second color space conversion unit to convert the second color space into a second Lab color space;
   a spherical color space conversion unit to expand the converted first Lab color space and the converted second Lab color space to a same spherical surface so as to convert the first Lab color space and the second Lab color space into a spherical color space; and
   a spherical gamut mapping unit to map a color gamut of the first Lab color space and a color gamut of the second Lab color space, expanded to the same spherical surface, in the converted spherical color space,
   wherein the spherical color space conversion unit generates a first coordinate system including three-dimensional points that are obtained by expanding the first Lab color space to the spherical surface having a designated radius, and a second coordinate system including three-dimensional points that are obtained by expanding the second Lab color space to the same spherical surface, and
   wherein the spherical gamut mapping unit determines a first point of the first coordinate system in the converted spherical color space that has a minimal distance difference with a respective point of the second coordinate system, and maps the first point to the respective point of the second coordinate system one-to-one so as to perform the gamut mapping between the Lab color space of the first coordinate system and the Lab color space of the second coordinate system.

2. The color space conversion apparatus as claimed in claim 1, wherein the first color space is a standard red, green, and blue (RGB) color space, and the second color space is a cyan, magenta, yellow, and key (CMYK) color space.

3. The color space conversion apparatus as claimed in claim 1, wherein the spherical gamut mapping unit determines a second point of the first coordinate system that does not correspond to any points of the second coordinate system one-to-one, and maps the second point to a point at a virtual location obtained by interpolation based on the points of the second coordinate system so as to perform the gamut mapping between the Lab color space of the first coordinate system and the Lab color space of the second coordinate system.

4. The color space conversion apparatus as claimed in claim 1, wherein the first point is from a plurality of points of the first coordinate system having minimal mean square error values from points of the second coordinate system.

5. A color space conversion apparatus to perform gamut mapping between a first color space and a second color space, the color space conversion apparatus comprising:
   a first color space conversion unit to convert the first color space into a first Lab color space;
   a second color space conversion unit to convert the second color space into a second Lab color space;
   a spherical color space conversion unit to expand the converted first Lab color space and the converted second Lab color space to a same spherical surface so as to convert the first Lab color space and the second Lab color space into a spherical color space; and
   a spherical gamut mapping unit to map a color gamut of the first Lab color space and a color gamut of the second Lab color space, expanded to the same spherical surface, in the converted spherical color space,
   wherein the spherical gamut mapping unit determines a first point of a coordinate system of the first Lab color space in the converted spherical color space that has a minimal distance difference with a respective point of a coordinate system of the second Lab color space, and maps the first point to the respective point of the second Lab color space one-to-one so as to perform the gamut mapping between the first Lab color space and the second Lab color space, and
   the spherical gamut mapping unit determines a second point of the coordinate system of the first Lab color space that does not correspond to any points of the coordinate system of the second Lab color space one-to-one, and maps the second point to a point at a virtual location obtained by interpolation based on the points of the second Lab color space so as to perform the gamut mapping between the first Lab color space and the second Lab color space.

6. A color space conversion apparatus to perform gamut mapping between a first color space and a second color space, the color space conversion apparatus comprising:
   a first color space conversion unit to convert the first color space into a first Lab color space;
   a second color space conversion unit to convert the second color space into a second Lab color space;
   a spherical color space conversion unit to expand the converted first Lab color space and the converted second Lab color space to a same spherical surface so as to convert the first Lab color space and the second Lab color space into a spherical color space; and
   a spherical gamut mapping unit to map a color gamut of the first Lab color space and a color gamut of the second Lab color space, expanded to the same spherical surface, in the converted spherical color space,
   wherein the spherical color space conversion unit generates a first coordinate system including three-dimensional points that are obtained by expanding the first Lab color space to the spherical surface having a designated radius, and a second coordinate system including three-dimensional points that are obtained by expanding the second Lab color space to the same spherical surface, and
   wherein the spherical gamut mapping unit determines a first point of the first coordinate system in the converted spherical color space that has a minimal lightness difference and color difference with a respective point of the second coordinate system, and maps the first point to the respective point of the second coordinate system one-to-one so as to perform the gamut mapping between the Lab color space of the first coordinate system and the Lab color space of the second coordinate system.

7. The color space conversion apparatus as claimed in claim 6, wherein the spherical gamut mapping unit determines a second point of the first coordinate system that does not correspond to any points of the second coordinate system one-to-one, and maps the second point to a point at a virtual location obtained by interpolation based on the points of the second coordinate system so as to perform the gamut mapping between the Lab color space of the first coordinate system and the Lab color space of the second coordinate system.

8. A color space conversion method between a first color space and a second color space, the color space conversion method comprising:
- converting the first color space into a first Lab color space;
- converting the second color space into a second Lab color space;
- expanding the first Lab color space and the second Lab color space to a same spherical surface so as to convert the first Lab color space and the second Lab color space into a spherical color space; and
- mapping a color gamut of the first Lab color space and a color gamut of the second Lab color space, expanded to the same spherical surface, in the converted spherical color space,
- wherein the expanding of the first Lab color space and the second Lab color space comprises generating a first coordinate system including three-dimensional points that are obtained by expanding the first Lab color space to the spherical surface having a designated radius, and generating a second coordinate system including three-dimensional points that are obtained by expanding the second Lab color space to the same spherical surface, and
- wherein the mapping of the color gamut of the first Lab color space and the color gamut of the second Lab color space comprises determining a first point of the first coordinate system in the converted spherical color space that has a minimal distance difference with a respective point of the second coordinate system, and mapping the first point to the respective point of the second coordinate system one-to-one so as to perform gamut mapping between the Lab color space of the first coordinate system and the Lab color space of the second coordinate system.

9. The color space conversion method as claimed in claim 8, wherein the first color space is a standard red, green, and blue (RGB) color space, and the second color space is a cyan, magenta, yellow, and key (CMYK) color space.

10. The color space conversion method as claimed in claim 8, wherein the mapping of the color gamut of the first Lab color space and the color gamut of the second Lab color space further comprises:
- determining a second point of the first coordinate system that does not correspond to any points of the second coordinate system one-to-one; and
- mapping the second point to a point at a virtual location obtained by interpolation using the points of the second coordinate system so as to perform the gamut mapping between the Lab color space of the first coordinate system and the Lab color space of the second coordinate system.

11. The color space conversion method as claimed in claim 8, wherein the first point is from a plurality of points of the first coordinate system having minimal mean square error values from points of the second coordinate system.

12. The color space conversion method as claimed in claim 8, wherein the mapping of the color gamut of the first Lab color space and the color gamut of the second Lab color space further comprises:
- determining a second point of the first coordinate system that does not correspond to any points of the second coordinate system one-to-one; and
- mapping the second point to a point at a virtual location obtained by interpolation using the points of the second coordinate system so as to perform the gamut mapping between the Lab color space of the first coordinate system and the Lab color space of the second coordinate system.

13. A non-transitory computer readable recording medium encoded with the method of claim 8 and implemented by a computer.

14. A color space conversion method between a first color space and a second color space, the color space conversion method comprising:
- converting the first color space into a first Lab color space;
- converting the second color space into a second Lab color space;
- expanding the first Lab color space and the second Lab color space to a same spherical surface so as to convert the first Lab color space and the second Lab color space into a spherical color space; and
- mapping a color gamut of the first Lab color space and a color gamut of the second Lab color space, expanded to the same spherical surface, in the converted spherical color space,
- wherein the mapping of the color gamut of the first Lab color space and the color gamut of the second Lab color space comprises:
  - determining a first point of a coordinate system of the first Lab color space in the converted spherical color space that has a minimal distance difference with a respective point of a coordinate system of the second Lab color space;
  - mapping the first point to the respective point of the second coordinate system one-to-one so as to perform gamut mapping between the first Lab color space and the second Lab color space;
  - determining a second point of the coordinate system of the first Lab color space that does not correspond to any points of the coordinate system of the second Lab color space one-to-one; and
  - mapping the second point to a point at a virtual location obtained by interpolation using the points of the second Lab color space so as to perform the gamut mapping between the first Lab color space and the second Lab color space.

15. A color space conversion method between a first color space and a second color space, the color space conversion method comprising:
- converting the first color space into a first Lab color space;
- converting the second color space into a second Lab color space;
- expanding the first Lab color space and the second Lab color space to a same spherical surface so as to convert the first Lab color space and the second Lab color space into a spherical color space; and
- mapping a color gamut of the first Lab color space and a color gamut of the second Lab color space, expanded to the same spherical surface, in the converted spherical color space,
- wherein the expanding of the first Lab color space and the second Lab color space comprises generating a first coordinate system including three-dimensional points that are obtained by expanding the first Lab color space to the spherical surface having a designated radius, and generating a second coordinate system including three-dimensional points that are obtained by expanding the second Lab color space to the same spherical surface, and
- wherein the mapping of the color gamut of the first Lab color space and the color gamut of the second Lab color space comprises determining a first point of the first coordinate system in the converted spherical color space that has a minimal lightness difference and color difference with a respective point of the second coordinate system, and mapping the first point to the respective point of the second coordinate system one-to-one so as to perform gamut mapping between the Lab color space of the first coordinate system and the Lab color space of the second coordinate system.

16. A color space conversion apparatus to perform gamut mapping between a first Lab color space converted from a first color space and a second Lab color space converted from a second color space, the color space conversion apparatus comprising:
   a spherical gamut mapping unit to map a color gamut of the first Lab color space and a color gamut of the second Lab color space, expanded to a same spherical surface, in a converted spherical color space,
   wherein the spherical gamut mapping unit determines a first point of a coordinate system of the first Lab color space in the converted spherical color space that has a minimal distance difference with a respective point of a coordinate system of the second Lab color space, and maps the first point to the respective point of the second Lab color space one-to-one so as to perform the gamut mapping between the first Lab color space and the second Lab color space.

17. The color space conversion apparatus as claimed in claim 16, wherein the spherical gamut mapping unit determines a second point of the coordinate system of the first Lab color space that does not correspond to any points of the coordinate system of the second Lab color space one-to-one, and maps the second point to a point at a virtual location obtained by interpolation based on the points of the second Lab color space so as to perform the gamut mapping between the first Lab color space and the second Lab color space.

18. The color space conversion apparatus as claimed in claim 16, wherein the first color space is a standard red, green, and blue (RGB) color space, and the second color space is a cyan, magenta, yellow, and key (CMYK) color space.

19. A color space conversion apparatus to perform gamut mapping between a first Lab color space converted from a first color space and a second Lab color space converted from a second color space, the color space conversion apparatus comprising:
   a spherical gamut mapping unit to map a color gamut of the first Lab color space and a color gamut of the second Lab color space, expanded to a same spherical surface, in a converted spherical color space,
   wherein the spherical gamut mapping unit determines a first point of the first coordinate system in the converted spherical color space that has a minimal lightness difference and color difference with a respective point of the second coordinate system, and maps the first point to the respective point of the second coordinate system one-to-one so as to perform the gamut mapping between the Lab color space of the first coordinate system and the Lab color space of the second coordinate system.

20. The color space conversion apparatus as claimed in claim 19, wherein the spherical gamut mapping unit determines a second point of the first coordinate system that does not correspond to any points of the second coordinate system one-to-one, and maps the second point to a point at a virtual location obtained by interpolation based on the points of the second coordinate system so as to perform the gamut mapping between the Lab color space of the first coordinate system and the Lab color space of the second coordinate system.

* * * * *

UNITED STATES PATENT AND TRADEMARK OFFICE
CERTIFICATE OF CORRECTION

| | | |
|---|---|---|
| PATENT NO. | : 8,139,265 B2 | Page 1 of 1 |
| APPLICATION NO. | : 12/143111 | |
| DATED | : March 20, 2012 | |
| INVENTOR(S) | : Jin Kyung Hong | |

It is certified that error appears in the above-identified patent and that said Letters Patent is hereby corrected as shown below:

Column 10, Line 23, In Claim 14, delete "comprises:" and insert -- comprises --, therefor.

Signed and Sealed this
Second Day of October, 2012

David J. Kappos
*Director of the United States Patent and Trademark Office*